United States Patent [19]

Re et al.

[11] Patent Number: 5,026,814

[45] Date of Patent: Jun. 25, 1991

[54] FLUORINATED POLYURETHANES ENDOWED WITH IMPROVED MECHANICAL PROPERTIES, CONTAINING RUBBER-LIKE POLYOXYPERFLUOROALKYLENE-STRUCTURE BLOCKS AND HYDROGENATED RIGID BLOCKS

[75] Inventors: Alberto Re, Milan; Francesco Giavarini, Castelli Calepio, Italy

[73] Assignee: Ausimont S.r.l., Milan, Italy

[21] Appl. No.: 407,951

[22] Filed: Sep. 15, 1989

[30] Foreign Application Priority Data

Sep. 15, 1988 [IT] Italy ................................. 21946 A/88

[51] Int. Cl.$^5$ ............................................. C08G 18/30
[52] U.S. Cl. .......................................... 528/61; 528/65; 528/70
[58] Field of Search ............................... 528/61, 65, 70

[56] References Cited

U.S. PATENT DOCUMENTS 4,782,130 11/1988 Re et al. ................................. 528/70
4,863,986 9/1989 Re et al. ................................. 528/70

Primary Examiner—Maurice J. Welsh
Attorney, Agent, or Firm—Stevens, Davis, Miller & Mosher

[57] ABSTRACT

The invention relates to polyurethanes comprising polyoxyperfluoroalkylene blocks of rubber-like nature and rigid segments derived from short-chain aliphatic diols, optionally from aliphatic diamines, and from aliphatic or cycloaliphatic or aromatic diisocyanate. The number of the rigid-type segments is equal to or greater than the number of the polyoxyperfluoroalkylene blocks. The polyurethane are characterized by a glass transition temperature lower than $-80°$ C., a tensile strength greater than 30 kg/cm$^2$, a hardness between 50 Shore A and 75 Shore D, and good thermoforming characteristics.

7 Claims, No Drawings

FLUORINATED POLYURETHANES ENDOWED WITH IMPROVED MECHANICAL PROPERTIES, CONTAINING RUBBER-LIKE POLYOXYPERFLUOROALKYLENE-STRUCTURE BLOCKS AND HYDROGENATED RIGID BLOCKS

FIELD OF THE INVENTION

The object of the present invention are fluorinated polyurethanes characterized by low glass transition temperature values (Tg even lower than $-110°$ C.) and by great mechanical properties. They permit structural uses under great operating conditions.

BACKGROUND OF THE INVENTION

Polyurethanes (PU) are known, which are characterized by the presence, in their structure, of polyoxyperfluoroalkylene blocks derived from the use of perfluoropolyethers (PFPE) having hydroxylated end groups.

Products of this type are described in particular in Italian patent No. 903,446, hereby incorporated by reference. They are characterized by a Tg lower than $-80°$ C. They retain flexibility and elastic properties even at very low temperatures.

The structure of these materials, which is predominantly characterized by the perfluoropolyethereal chain, involves, however, a low mechanical resistance. To obviate this drawback, it is necessary to impart to them a three-dimensional lattice by cross-linking them either using three-functional chemical agents or through the formation of allophanate or isocyanurate.

However the materials obtained do not possess an optimal combination of mechanical characteristics such as hardness, tensile strength, modulus of elasticity, and elongation. In particular, the hardness values are lower than 50 Shore A. The tensile strength values are generally lower than 10 kg/cm$^2$. Furthermore, these materials, as they are cross-linked, cannot be processed according to the process technologies which are typical of the thermoplastic materials, such as extrusion, injection molding, and blow molding.

Also, these materials generate processing waste problems. These materials cannot be transformed. Thus, they cannot be subsequently utilized.

A substantial improvement in the aggregate of mechanical properties has been obtained by introducing encumbering blocks consisting of aromatic or cycloaliphatic diols according to the process claimed by applicants in European patent application No. 192,190, hereby incorporated by reference.

The fluorinated polyurethanes obtained through this process are characterized by a number ratio between blocks deriving from the aromatic or cycloaliphatic diol and perfluoropolyethereal blocks less than or equal to 1. The resulting materials do not exhibit very great tensile strength values, in most cases not greater than 25 kg/cm$^2$.

To obtain greater values, it is necessary to use bisphenols in a high ratio, about 1. See example H of the above-cited patent. In this example, the presence of the aromatic diols in the polymeric structure is a limitation to the use of the materials at high temperatures. Furthermore, the elastomeric properties at low temperatures worsen because, in spite of the low Tg, the modulus of elasticity is too great for the usual uses of the rubbers.

Thus, it is an object of the present invention to obtain fluorinated polyurethanes having a glass transition temperature lower than $-80°$ C. and being characterized by hardness values ranging from 50 Shore A to 75 Shore D and by tensile strength values greater than 30 kg/cm$^2$.

DETAILED DESCRIPTION OF THE INVENTION

The polyurethane elastomers forming the object of the present invention have a structure consisting of rubber-like blocks alternated with rigid blocks. The average molecular weight of the polyurethane is between 25,000 and 250,000, preferably between 50,000 and 250,000.

The rubber-like blocks consist of polyoxyperfluoroalkylene chain. The rigid blocks, which influence and characterize the mechanical properties of the final polymers obtained derive from the use, as starting products, of a difunctional compound not containing perfluoropolyethereal or polyethereal (polyether polyols) chains, selected from diols and diamines of the hydrogenated or also fluorinated aliphatic type, having a short chain (not exceeding 12 carbon atoms).

In the products according to the present invention, the numerical ratio between rigid blocks and rubber-like blocks is greater than or equal to 1, preferably between about 1 and 4.5.

In this way, it is possible to obtain thermoplastic fluorinated polyurethanes, which are processable according to the process technologies of the thermoplastic materials.

The average molecular weight of the rigid block component is in a range between 25 and 1000, preferably between 100 and 500. For example, the difunctional short ($C_2$–$C_{12}$) molecule may have in part a functionality greater than 2. This permits cross-linked materials having the mechanical properties described above to be obtained.

In the polyurethanes according to the present invention, the rubber-like blocks typical of their structure are composed of sequences of oxyperfluoroalkylene units having an average molecular weight from about 1,500 to 15,000, preferably from about 2,000 to 6,000.

In the presence of an increase in the molecular weight of the perfluoropolyethereal block it has been ascertained that, to obtain a combination of optimal properties of the final polyurethane, it is preferable to employ increasing ratios between rigid blocks and rubber-like blocks.

The rubber-like blocks derive from the use, as a starting product, of a perfluoropolyether diol belonging to the following classes of compounds:

a)

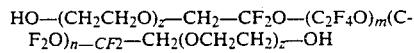

wherein z ranges from 0 to 3 (extremes included), the m/n ratio ranges from 0.2 to 2, preferably from about 0.5 to 1.2, m and n having such values that the molecular weight is in the above range;

b)

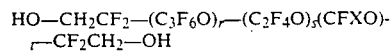

wherein:

X=F or CF$_3$, r, s, t are 0 or represent integers between 1 and 100, with the proviso that r+s is different from 0, and that molecular weight is in the above range;

c)

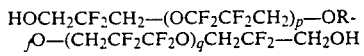

wherein:

$R_f$ represents a fluoroaliphatic group, preferably a perfluoroalkylene group, also containing hetero-atoms, preferably from 2 to 4, O or N atoms in the chain, the fluoroaliphatic group containing from 1 to 21 carbon atoms, preferably from 1 to 4 carbon atoms in the chain, particularly when $R_f$ is a perfluoroalkylene group, p and q represent integers from 1 to 100 with the proviso that p+q is greater than 2 and $R_f$, p and q being such that the molecular weight is in the above range;

d)

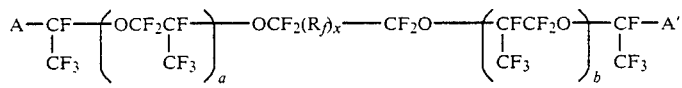

wherein:

$R_f$ represents a fluoroaliphatic group as above defined for structure c), A and A' represent end groups containing —OH groups, preferably —CH$_2$OH groups, x represents 0 or 1, a and b represent integers from 1 to 100, with the proviso that a+b is greater than 2, and that $R_f$, x, a and b are such that the molecular weight is in the above range.

The diols of type a) are described in Italian patent No. 903,446. The diols of type b) are prepared according to the methods described in U.S. Pat. Nos. 3,847,978 and 3,810,874, starting from the fluorides of the diacids described in U.S. Pat. No. 3,665,041, all hereby incorporated by reference.

The diols of type c) can be obtained by reduction of the diacyl fluorides, which are described in European patent application No. 148,482. The diols of group d) are described in European patent application No. 151,877, both hereby incorporated by reference.

It is possible to use also diols with repeating units —CF$_2$CF$_2$O—, —CF$_2$CF$_2$CF$_2$O—, CF(CF$_3$)CF$_2$O—. These products are prepared according to the process described in Applicants' U.S. Pat. No. 4,720,527, hereby incorporated by reference.

The perfluoropolyethereal block can be derived also from the use, as a starting product, of a perfluoropolyether with both end groups being isocyanate groups and with a perfluorooxyalkylene chain of the above-indicated type. Compounds of such type are described in U.S. Pat. No. 3,810,874, hereby incorporated by reference.

The rubber-like blocks may also consist in part of hydrogenated polyols both of the polyester polyol type and of the polyether polyol type. Examples thereof are: poly(ethylene glycol), poly(propylene glycol), poly(tetramethylene glycol), poly(1,4-butandiol adipate), poly(ethandiol-1,4-butandiol adipate), poly(1,6-hexandiol-neopentyl glycol adipate), poly($\epsilon$-caprolactam), poly(1,6-hexandiol carbonate).

In the polyurethanes according to the present invention, the rigid block derives from the use of the following components:

a) Hydrogenated or fluorinated short C$_2$–C$_{12}$ aliphatic diol

Examples of a short hydrogenated diol are: ethylene glycol; 1,4-butandiol; 1,6-hexandiol.

Examples of a short fluorinated diol are: C$_2$F$_4$ telomers with OH end groups, or perfluoropolyether $\alpha\omega$-diol having a molecular weight from 400 to 500, such as Fomblin Z produced by Montefluos.

b) Hydrogenated C$_2$–C$_{12}$ diamine and hydrating

Examples of a short hydrogenated diamine are: hydrazine, ethylenediamine, hexamethylenediamine, 3,3'-dichloro-4,4'-diamine diphenylmethane, m-phenylenediamine.

The diisocyanates to be utilized for preparing the polyurethanes according to the invention are the ones of the aromatic type such as e.g. 2,4- or 2,6-toluene diisocyanate, xylylene diisocyanate, 4,4'-diphenylmethane diisocyanate, naphthalene-1,5-diisocyanate, p-phenylene-diisocyanate; both the ones of the aliphatic type among which hexamethylene diisocyanate, isophorone diisocyanate, 4,4'-dicyclohexylmethane diisocyanate, cyclohexyl-1,4-diisocyanate, and, last, the ones of the fluorinated type, among which tetrafluorophenylene diisocyanate or 6-chloro-2,4,5-trifluorobenzene-1,3-diisocyanate.

It is possible also to use a perfluoropolyether diisocyanate, as mentioned hereinbefore.

The polymeric materials of the invention can be obtained in a more or less cross-linked state by also using reagents having a functionality greater than 2 to prepare them. The following ones can be such cross-linking agents: trimethylol propane, glycerine, diethylene triamine, tertiary aminic compounds of the type of the ones described in European patent application No. 291,855, hereby incorporated by reference, tri- or polyisocyanate such as hexamethylene diisocyanate trimer (Desmodur N ®) or toluene diisocyanate trimer (Desmodur IL ®).

Synthesis of the Materials

The fluorinated polyurethanes of the present invention can be advantageously prepared by operating in two steps (prepolymer method).

1st Step - prepolymer synthesis

The perfluoropolyether macroglycol, optionally dissolved in a proper solvent, is reacted with the diisocyanate in excess so that the NCO/OH ratio may be greater than or equal to 2. An isocyanate-terminated prepolymer is obtained.

This step can be avoided if a fluorinated diisocyanate having a PFPE structure is utilized.

2nd Step - chain extension

The method to be followed for carrying out the second step depends on the type of material to be obtained (thermoplastic and thermosetting).

Thermoplastic polyurethanes.

The second step can be conducted either in solution or in mass. In the former case, the isocyanic prepolymer solution or the perfluoropolyethereal diisocyanate dissolved in a proper solvent optionally containing a non-perfluoropoly-ethereal diisocyanate, is reacted at 20°–70° C. with the diol or the diamine to have a NCO- /OH(NH) groups ratio equal to 1. The rigid blocks consisting of the diol and diamine will be present in the structure of the final polymer obtained in a numerical ratio greater than or equal to 1 regarding the rubber-like blocks composed of perfluoropolyether chain. The reaction time may range from 1 hour to 8 hours. The reaction is followed using IR spectroscopy, checking the disappearance of the NCO band at 2270 cm$^{-1}$. On conclusion of the reaction, the polymer is precipitated in excess $H_2O$. After a few further washings with $H_2O$, it is filtered and vacuum dried.

In the latter case, the isocyanic prepolymer, after removal of the solvent, or the perfluoropolyether diisocyanate, optionally also containing a nonperfluoropolyether diisocyanate, is reacted at 20°–120° C. with the diol or the diamine to have a NCO/OH(NH) groups ratio giving rise to the formability of chains as defined ranging from 1 to 1.05. The reaction time varies from 1 hour to 8 hours. The reaction is followed using IR spectroscopy, similar to the preceding case. On conclusion of the reaction, the polymeric and highly viscous mass is extruded and pelletized.

Thermosetting polyurethanes.

The second step is conducted by reacting the isocyanic prepolymer with a mixture consisting of:
 a short diol or diamine, and
 a cross-linking agent.

In such mixture, the short molecule/cross-linking agent equivalents ratio may range from 0.1 to 10, preferably from about 0.5 to 2.

The reaction is conducted in mass by mixing the components at 50°–120° C. Then the mixture is poured in a mold. Cross-linking occurs at 20°–120° C. during a time varying from 1 hour to 24 hours.

As an alternative, the thermosetting polyurethane can be prepared starting from a -OH-terminated prepolymer, prepared by adding the diol to the -NCO-terminated prepolymer of the first step, and by subsequent cross-linking with a triisocyanate (or polyisocyanate).

The fluorinated polyurethanes synthesis reaction yield can be raised by adding a proper catalyst system such as, for example, tin derivatives, such a dibutyl tin dilaurate, dibutyl tin acetate, dibutyl tin oxide; iron derivatives such as ferroacetylacetonate; titanium alcoholates such as titanium tetraisopropylate; tertiary amines such as triethylamine, or N-methyl morpholine, in amounts ranging from 0.001 to 2% by weight, preferably from 0.01 to 0.5% by weight, referred to the total weight.

The fluorinated polyurethanes according to the present invention are thermoplastic elastomers characterized by the following properties:
 tensile strength equal to at least 30 kg/cm$^2$,
 hardness from 50 Shore A to 75 Shore D,
 excellent flexibility at very low temperatures, even lower than −100° C.,
 resistance to hydrolytic degradation and to the attack by the most usual chemical agents, oils, and fuels,
 surface properties of smoothness (self-lubrication) and of oil-repellency and water-repellency, and
 excellent optical properties (low refraction index) and excellent dielectric properties.

The fluorinated polyurethanes can be formulated by adding to them conventional fillers and pigments, for example antioxidants, U.V. stabilizers and reinforcing fillers such as carbon black, stearic acid, or graphite. Furthermore, thanks to the sufficient fluorine content, they are compatible with fillers such as fluorinated polymers, in particular polytetrafluoroethylene.

Utilities

The fluorinated polyurethanes, which are the object of the present invention, are utilizable for manufacturing structural elements such as gaskets, couplings, components for valves and fittings, insulating and protective membranes, adhesives, sealing agents to be used where it is operated under utmost severe conditions, in particular where the elastomeric properties must be retained at very low temperatures (arctic rubbers).

Particularly interesting fields of use are, therefore, the aeronautical, aerospace, oil, and chemical industries.

Another use in the field of thermoplastics is represented by the use as soluble resins, characterized by a high film-forming power and coating power, for uses in the electronic industry as conformal coatings endowed with an excellent resistance to chemical agents and with very good optical and dielectric properties.

Further uses as components of painting formulations, characterized by a high oil- and water-repellency, a low critical surface tension and a low friction coefficient, for uses in the textile, leather, marine, naval, and aeronautical sectors.

Another use of particular interest is protection and lubrication of surfaces subjected to friction and wear, such as, for examples, magnetic recorders and accessories for cassettes containing magnetic tapes.

Last, still another use of particular interest concerns structural materials to be used in the biomedical sector, for the manufacture of artificial organs, artificial blood-vessels, membranes, structural materials which must be endowed with excellent mechanical, antithrombosis, and resistance to degradation properties.

Characterization of the Materials

The fluorinated polyurethanes have been characterized according to the following standards.

| | |
|---|---|
| Hardness (Shore A and Shore D) | ASTM 2240 |
| Tensile properties (tensile strength (T.S.) and 100% modulus (M 100%) | ASTM D 412 |
| Elongation at break (%) | ASTM 412 |
| Friction coefficient | ASTM D 1894 |
| Contact angle | ATICELCA.MC 21-72 |
| Tg by means of differential scanning calorimetry (D.S.C.) | |

EXAMPLES

The following examples are given for illustrative purposes and are not to be intended as a limitation of the possible embodiments of the invention.

In the examples, the following abbreviations have been adopted:
 ZDOL = compound of class a) wherein 2 equals 0;
 ZDOL TX = compound of class a) wherein 2 is greater than 1.3
 Delifrene ® = trichlorotrifluoroethane of Montefluos
 PFPE = perfluoropolyether diol.

EXAMPLE 1

Synthesis of an isocyanate terminated prepolymer by reaction of a perfluoropolyether diol with a diisocyanate.

There were used a perfluoropolyether MW2000 ZDOL with —CH$_2$OH end groups having an equivalent weight=1116 and, as an isocyanate, 4,4'-dicyclohexylmethane diisocyanate. The preparation was conducted in solution. 11.75 g of diisocyanate dissolved in 30 cc of a Delifrene/tetrahyd-rofuran (THF) mixture in a 1:1 ratio were introduced into a 4-neck flask equipped with stirrer, reflux cooler, dropping funnel, and nitrogen storage tank. The temperature was brought to 50° C. In a nitrogen atmosphere, 50 g of diol were dropped. The reaction was carried on maintaining this temperature until reaching, after 3 hours, the desired progress step (3.05% by weight of NCO groups). The reaction mixture was then cooled to stop the reaction. After removal of the solvent, the prepolymer was isolated in the form of a colorless and highly viscous liquid.

EXAMPLES 2-9

A series of prepolymers were prepared by following the method and the conditions described in example 1.

As perfluoropolyether diols, the following were used:
 the diol MW2000 ZDOL, having an equivalent weight=1116;
 an analogous compound MW4000 ZDOL having an equivalent weight=2103;
 a PFPE diol with -CH$_2$CH$_2$OH end groups having an equivalent weight=1150 (referred to as MW2000 ZDOL TX);
 an analogous compound having an equivalent weight=2260 (referred to as MW4000 ZDOL TX).

As diisocyanates, the following were used:
4,4'diphenylmethane diisocyanate (MDI);
4,4'dicyclohexylmethane diisocyanate (HhMDI);
isophorone diisocyanate (IPDI).

The characteristics of the prepolymers prepared are illustrated in Tables 1 and 2. These compounds are high-viscosity liquids or low-melting solids. They must be preserved under vacuum to prevent any contact with moisture. Under these conditions, they are stable for many months.

TABLE 1

| EXAMPLE | ZDOL 2000 (eq) | ZDOL 4000 (eq) | H$_{12}$MDI (eq) | MDI (eq) | IPDI (eq) | % BY WEIGHT NCO | % BY WEIGHT PFPE |
|---|---|---|---|---|---|---|---|
| 1 | 1 | — | 2 | — | — | 3.05 | 87 |
| 2 | — | 1 | 2 | — | — | 1.78 | 89 |
| 3 | 1 | — | — | 2 | — | 3.07 | 82 |
| 4 | — | 1 | — | 2 | — | 1.78 | 89 |
| 5 | — | 1 | — | — | 2 | 1.81 | 90 |

TABLE 2

| EXAMPLE | ZDOL 2000 TX (eq) | ZDOL 4000 TX (eq) | H$_{12}$MDI (eq) | IPDI (eq) | % BY WEIGHT PFPE | % BY WEIGHT NCO |
|---|---|---|---|---|---|---|
| 6 | 1 | — | 2 | — | 81 | 2.97 |
| 7 | — | 1 | 2.5 | — | 87 | 2.45 |
| 8 | — | 1 | 2 | — | 90 | 1.66 |
| 9 | 1 | — | — | 3 | 87 | 3.24 |

EXAMPLE 10

The preparation of one of the polyurethanes of the invention using a solution reaction described in this example.

A solution of 60 g (0.022 moles) of the prepolymer of example 1 dissolved in 30 cc of a Delifrene ®/THF mixture (1:1 ratio) was introduced into a flask equipped with stirrer and N$_2$ storage tank. It was heated to 55° C. After intense stirring, to the solution there were added, by dropping, 1.96 g (0.022 moles) of 1,4-butane diol dissolved in 10 cc of THF. The reaction was controlled using I.R. spectroscopy, by following the decrease of the NCO band at 2270 cm$^{-1}$. After 6 hours, after having reached the polymerization degree to be obtained, the polymer was precipitated in 1 liter of H$_2$O. The precipitate was repeatedly washed with H$_2$O, filtered, and dried during 12 hours under vacuum at 60° C.

At the end, the polymer was obtained in the form of a granular light-color solid.

The polymer was placed into a 120×120×2 mm mold and then molded at 160° C. with a press. A small transparent plate of thermoplastic polyurethane was obtained and its mechanical properties were determined as reported on Table 3.

EXAMPLES 11-14

Following the modalities of example 10, a series of thermoplastic polyurethanes was prepared by using the prepolymers of examples 1-7.

As a chain extender, use was made of:
1,4-butane diol (BDO).

Table 3 indicates the various formulations and the mechanical characteristics of the test pieces obtained after molding.

TABLE 3

| EXAMPLE | PREPOLYMER (ref. ex.) | Chain extender | % b. weight chain extender | melting T. Tg (°C.) | hardness (Shore A) | $M_{100\%}$ (kg/cm$^2$) | Tensile strength (kg/cm$^2$) | Elong. at break (%) |
|---|---|---|---|---|---|---|---|---|
| 10 | 1 | BDO | 3.2 | −108 | 90 | 58 | 76 | 495 |
| 11 | 2 | BDO | 1.9 | −112 | 60 | 26 | 31 | 290 |
| 12 | 5 | BDO | 1 | −110 | 60 | 23 | 31 | 350 |
| 13 | 6 | BDO | 3.1 | −108 | 87 | 57 | 70 | 524 |
| 14 | 7 | BDO | 2.6 | −110 | 73 | 41 | 44 | 170 |

EXAMPLE 15

This example concerns the preparation of one of the polyurethanes of the invention using mass reaction of the prepolymer with a chain extender.

1.86 g (0.022 moles) of 1,4-butane diol, which had been previously dried, were added to 60 g (0.022 moles) of the prepolymer of example 1 at a temperature of 80° C. in a reactor equipped with a bottom discharge.

The mixture was vigorously stirred. The reaction environment was maintained in a nitrogen atmosphere. The reaction trend was followed either by controlling, using I.R. spectroscopy, the disappearance of the band at 2270 cm$^{-1}$ or by controlling the viscosity increase. After one hour the temperature was brought to 120° C. After an additional 45 minutes, after having reached the desired polymerization degree, vacuum was applied to strip off the gasses from the mixture, which was then extruded and pelletized. To obtain a characterizable test piece, the pellets were placed into a 120×120×2 mm mold and then molded with a press.

A small transparent thermoplastic polyurethane plate was obtained. After post-curing at 100° C. for 12 hours, the mechanical properties indicated in Table 4 were determined.

EXAMPLES 16-20

Following the method described in example 15, a few thermoplastic polyurethanes were prepared. The prepolymers of examples 1-9 and the following chain extender were used:

1,4-butane diol (BDO);
3,3,4,4,5,5,6,6-octafluoro-1,8-octane diol (OFOD).

The various formulations and the corresponding mechanical characteristics are indicated in Table 4.

react for 4 hours up to to the desired reaction progress degree. The condensates were then recovered. 4 g of BDO dissolved in 50 cc of THF were gradually added while simultaneously separating a solvent fraction rich in Delifrene ®. 100 cc of solvent (8:2 Delifrene/THF) were separated. When dropping was concluded, 50 cc of THF were introduced into the reaction flask. After a 16-hour reaction, which was followed using I.R. spectroscopy, the desired polymerization degree was reached. The polymer was discharged in H$_2$O, repeatedly washed and then filtered and dried.

The polymer obtained was in the form of a white granular solid, which was placed into a 120×120×2 mm mold and was molded at 160° C. with a press. The thermoplastic polyurethane transparent little plate so obtained was utilized for determining the mechanical properties, which were as follows:

| Hardness (Shore A) | $M$100% (kg/cm$^2$) | T.S. (kg/cm$^2$) | E.B. (%) |
| --- | --- | --- | --- |
| 76 | 53 | 78 | 715 |

EXAMPLE 22

Preparation of a cross-linked fluorinated polyurethane.

80 g of the prepolymer of example 9 were reacted, in a reactor equipped with a mechanical stirrer and with a bottom discharge, with a mixture consisting of 1.4 g of 1,4-butane diol and 1.35 g of 1,1,1-tris-(hydroxymethyl)-propane (TMP) at a temperature of 80° C. under intense stirring and maintaining a N$_2$ flow. After 20 minutes the temperature was brought to 120° C. The fluid mass was degassed and poured into a 120×120×2 mm mold.

TABLE 4

| EXAMPLE | PREPOLYMER (ref. ex.) | Chain extender | % b. wg. chain extender | Tg (°C.) | hardness (Shore A) | $M$100% (kg/cm$^2$) | Tensile strength (kg/cm$^2$) | Elong. at break (%) |
| --- | --- | --- | --- | --- | --- | --- | --- | --- |
| 15 | 1 | BDO | 3 | −108 | 82 | 59 | 50 | 330 |
| 16 | 1 | OFOD | 9.2 | −115 | 68 | 26 | 31 | 350 |
| 17 | 3 | BDO | 3 | −105 | 76 | 32.5 | 65.5 | 476 |
| 18 | 6 | BDO | 2.9 | −108 | 87 | 64 | 64 | 353 |
| 19 | 8 | BDO | 1.7 | −115 | 72 | 38 | 43 | 232 |
| 20 | 9 | BDO | 3.2 | −110 | 66 | 30 | 70 | 655 |

EXAMPLE 21

One of the polyurethanes of the invention was prepared by utilizing a mixture of perfluoropolyether diol and hydrogenated macroglycol. As a hydrogenated macroglycol, a poly(tetramethylene glycol) having an equivalent weight=501.5 (PTMEG 1000) was used. As a fluorinated macroglycol, ZDOL TX MW 2000 was used.

24 g of PTMEG 1000 in 50 cc of THF were fed to a 500 cc flask equipped with a mechanical stirrer, a reflux cooler with a N$_2$ storage tank and a dropping funnel. Subsequently, 50 g of ZDOL 2000 TX dissolved in 50 cc of Delifrene ® were dropped. In a nitrogen atmosphere, the solution was heated to 60° C. by adding 100 cc of Delifrene ® to obtain a homogeneous solution. 24 g of H$_{12}$MDI were then added, allowing the whole to After a 4-hour cross-linking at 120° C., the mechanical properties indicated in Table 5 were determined.

EXAMPLES 23-24

Following the method of example 22, a series of cross-linked fluorinated polyurethanes was prepared. The prepolymers of examples 8 and 9 were used. As cross-linking agents, the following mixtures were utilized:

A: 100 eq. of BDO + 100 eq. of TMP (trimethylolpropane)
B: 100 eq. of OFOD + 100 eq. of TMP.

Table 5 indicates the various formulations and the characteristics thereof.

TABLE 5

| EXAMPLE | PREPO-LYMER (ref. ex.) | Cross-linking mixture | % b. weight of cross-linking mixture | Tg (°C.) | Hardness (Shore A) | Hardness (Shore D) | $M100\%$ (kg/cm$^2$) | Tens. streng. (kg/cm$^2$) | Elong. at br. (%) |
|---|---|---|---|---|---|---|---|---|---|
| 22 | 9 | A | 3.35 | −112 | — | 45 | 92.4 | 254 | 484 |
| 23 | 9 | B | 6.82 | −112 | — | 43 | 72.2 | 220 | 547 |
| 24 | 8 | A | 3.45 | −115 | 66 | — | 31.5 | 62 | 476 |

EXAMPLE 25

Preparation of a thermoplastic fluorinated polyurethane and evaluation of its characteristics to the purpose of a use thereof in the field of coatings.

Preparation of the polymer

The preparation was carried out by using, as a perfluoropolyether diol, a ZDOL having an eq. weight = 896. 100 g of ZDOL were reacted with 66 g of $H_{12}MDI$ and 17.6 g of BDO according to the method described in example 10. A polymer containing 54% by weight of macroglycol was obtained. This polymer was soluble in hot THF and in cold 2,2,2-trifluoroethanol.

Determination of the polymer characteristics

The polyurethane so obtained was dissolved in 2,2,2-trifluoroethanol to obtain a solution at 30% by weight. The solution was spread on a copper sheet. After evaporation at room temperature, a transparent, 5-micron thick film having a refraction index $n_D^{20} = 1.42$ was obtained.

On the film, the electric properties of the material were determined. The following values were obtained:

| | | |
|---|---|---|
| Dielectric constant | (ASTM D150/50Hz) | 2.5 |
| Dispersion factor | (ASTM D150/50Hz) | $6.10^{-3}$ |
| Dielectric strength | (ASTM D149/KV cm$^{-1}$) | 21 |
| Volume resistivity | (ASTM D257/52 cm) | $5.10^{15}$ |

EXAMPLE 26

A possible use of the polyurethanes of the present invention are lubrication and protection of surfaces subjected to friction and wear, such as, for example, magnetic recording means and surfaces of accessory elements, slides, guides made of metals or sintered alloys.

The polyurethane of example 25 was dissolved in 2,2,2-trifluoroethanol. The solution was utilized to obtain films having a thickness of 80 Å.

For comparative purposes, an overcoat was prepared by using an isocyanate ended perfloropolyether of U.S. Pat. No. 3,810,884, Col 3, structure 12, hereby incorporated by reference. ZDISOC in a 1,1,2-trichlorotrifluoroethane solution in the presence of a cross-linking catalyst, operating at backing temperatures of 120° C. for 8 hours.

The polymeric films were characterized using the following measurements:

friction coefficient:
it was determined on metal plated (rigid) discs, in which the magnetic layer consisted of a Co/Ni or Co/Ni/P alloy; the following results were obtained:

| | Friction coefficient |
|---|---|
| ZDISOC overcoat thickness 80 Å | 0.35 |
| Polyurethane overcoat of example 26 thickness 80 Å | 0.15 | contact angle:
it was determined by depositing fluorinated polyurethanes overcoat layers on floppy discs, wherein the magnetic layer consisted of $\gamma$ Fe$_2$O$_3$ dispersed in a polyurethane plastic matrix. The following data were obtained:

| | Contact angle with H$_2$O |
|---|---|
| ZDISOC overcoat thickness 200Å | 55 |
| Polyurethane overcoat of example 26 thickness 200 Å | 105 |

Wear test:
the wear protection was determined, on a floppy 5.25 disc, MnZn Ferrite 10 g load head, by carrying out a start and stop test. During this test, the storage unit was subjected to start and stop cycles during which the head sliding causes a degradation of the magnetic surface and at last an abrasion of same. The purpose of the protective polymeric layers based on fluorinated polyurethanes is that of reducing as much as possible the wear induced in these conditions.
The life of the magnetic means is expressed by the number of start and stop cycles carried out before ascertaining a 10% loss in signal or an unallowable drop-out amount.

The following data were obtained:

| | CSS No. (cyclic start and stop) |
|---|---|
| ZDISOC overcoat thickness 80 Å | 10,000 |
| polyurethane overcoat of example 26 thickness 80 Å | 29,000 |

The surface mechanical characteristics were determined by evaluating the tangential stress necessary to cause the detaching and starting of a loaded head after a fix storage period (at 20° C., 85% of relative humidity for 10 h). This stress is usually called "stiction". It must be as low as possible to avoid damages to the head holder system during the starting of a rigid disk storage unit. The test was carried out on a 5.25 floppy disc as above and MnZn Ferrite 10 g load head, whereby obtaining the following results:

| | Stiction |
|---|---|
| ZDISOC overcoat thickness 80 Å | 5 |
| Polyurethane overcoat of example 26 thickness 80 Å | 0.15 |

EXAMPLE 27—COMPARATIVE TEST

Polyurethane prepared according to example H of European patent No. 192,190 in the name of the applicant.

A solution of 9 g (26.7 millimoles) of bisphenol AF in a Delifrene/acetone (80/20 by volume) mixture was added, in a nitrogen atmosphere, to 80 g (26.7 millimoles) of α, ω-bis(tolylisocyanate)polyoxyperfluoroalkylene having a molecular weight=3,000 and to 0.25 g of a 0.25 M of butyl tin acetate in acetone.

The whole was permitted to react at 50° C. for 3 hours under gradual removal of the solvents. A homogeneous and viscous mixture was obtained, which, after degassing, was poured into a mold and allowed to rest at 50° C. for 24 hours and at 100° C. for 6 hours.

The obtained polyurethane was thermoelastomeric, transparent, soluble in Delifrene exhibited a Tg=120° C. and was characterized by the following mechanical properties:

hardness (Shore A/3"): 73
elongation at break: 128%
tensile stength: 21.8 kg/cm$^2$ From comparison between the above-indicated characteristics and the ones of example 17, in which an aliphatic diol instead of bisphenol AF was used and the ratio between perfluoropolyether and diol was maintained unchanged, it is apparent that, with hardness of the same order, the mechanical properties of the product according to the present invention are by far higher.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. Polyurethanes comprising in their structure polyoxyperfluoroalkylene blocks of rubber-like nature deriving from a polyfluoropolyether having hydroxylated and/or isocyanate end groups, and rigid blocks or segments deriving from short-chain aliphatic diols and/or from low molecular weight aliphatic or aromatic diamines, the number of rigid segments being equal to or greater than the number of the rubber-like blocks, the polyurethanes being prepared using aliphatic, cycloaliphatic, or aromatic diisocyanates or polyfluoropolyether diisocyanates and characterized by a tensile strength greater than 30 kg/cm$^2$, by a glass transition temperature lower than $-80°$ C. and by a hardness ranging from 50 Shore A to 75 Shore D.

2. The polyurethanes according to claim 1, wherein the rigid blocks or segments are fluorinated.

3. The polyurethanes according to claim 1, wherein the rubber-like blocks consist of sequences, having an average molecular weight from 1,500 to 15,000, of one or more oxyperfluoroalkylene units deriving from perfluoropolyether diols belonging to the following classes of compounds:

a)

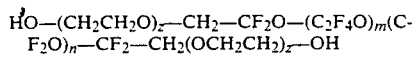

wherein z ranges from 0 to 3 (extremes included), the m/n ratio ranges from 0.2 to 2, m and n having such values that the molecular weight is in the above range;

b)

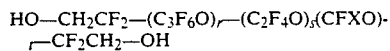

wherein:
X=F or CF$_3$, r, s, t are 0 or integers between 1 and 100 with the proviso that r+s is different from 0, and that
molecular weight is in the above range;

c)

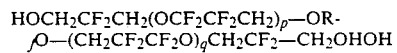

wherein:
R$_f$ represents a fluoroaliphatic group also containing heteroatoms, p and q are integers between 1 and 100 with the proviso that p+q is greater than 2 and R$_f$, p and q are such that the molecular weight is in the above range:

d)

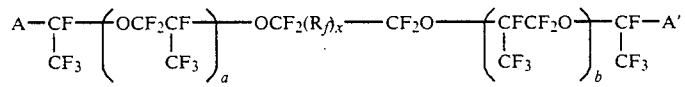

wherein:
R$_f$ is a fluoroaliphatic group as above, A and A' are end groups containing —OH, x is 0 or 1 and a and b are integers between 1 and 100, with the proviso that a+b is greater than 2 and that R$_f$, x, a and b are such that the molecular weight is in the above range.

4. The polyurethanes according to claim 1 having a cross-linked structure and obtained by utilizing, for their preparation, polyols or amines or isocyanates having a functionality degree greater than 2.

5. The polyurethanes according to claim 3, wherein the rubber-like blocks consist of sequences, having a molecular weight from 1,500 to 15,000, of one or more oxyperfluoropolyether units deriving from perfluoropolyether diisocyanates or belonging to the perfluoropolyether classes indicated in claim 3.

6. The polyurethanes according to claim 3, wherein the m/n ratio ranges from 0.5 to 1.2.

7. The polyurethanes according to claim 3, wherein A and A' are —CH$_2$OH groups.

* * * * *